United States Patent [19]

Norbury

[11] Patent Number: 4,993,538
[45] Date of Patent: Feb. 19, 1991

[54] APPARATUS FOR CLEANING OVERHEAD CONVEYOR TROLLEYS

[76] Inventor: Fritz Norbury, 1344 Country Squire Dr., Columbia, S.C. 29212

[21] Appl. No.: 481,598

[22] Filed: Feb. 20, 1990

[51] Int. Cl.⁵ .............................................. B65G 45/00
[52] U.S. Cl. ............................... 198/495; 134/115 R; 134/45; 134/104.1
[58] Field of Search ................... 198/495, 494, 500; 104/279, 280; 134/115 R, 45, 58 R, 104.1, 201; 17/44.2

[56] References Cited

U.S. PATENT DOCUMENTS

| | | | |
|---|---|---|---|
| 4,212,372 | 7/1980 | Murphy et al. | 198/500 X |
| 4,506,763 | 3/1985 | Frost et al. | 198/500 X |

FOREIGN PATENT DOCUMENTS 188226 11/1983 Japan ..................... 198/500

Primary Examiner—H. Grant Skaggs
Assistant Examiner—Cheryl L. Gastineau
Attorney, Agent, or Firm—F. Rhett Brockington

[57] ABSTRACT

An apparatus for cleaning the wheels of a trolley of an overhead conveyor, particularly overhead conveyors used in poultry processing, where the apparatus is positioned in-line and coextensive with the guide rail, wherein said apparatus is comprised of an I beam which has been modified such that a spray of high pressure heated water emanates from both lateral faces of the vertical structural component of the I beam, wherein said spray deluges the wheels with water when a trolley passes through the cleaning apparatus.

12 Claims, 2 Drawing Sheets

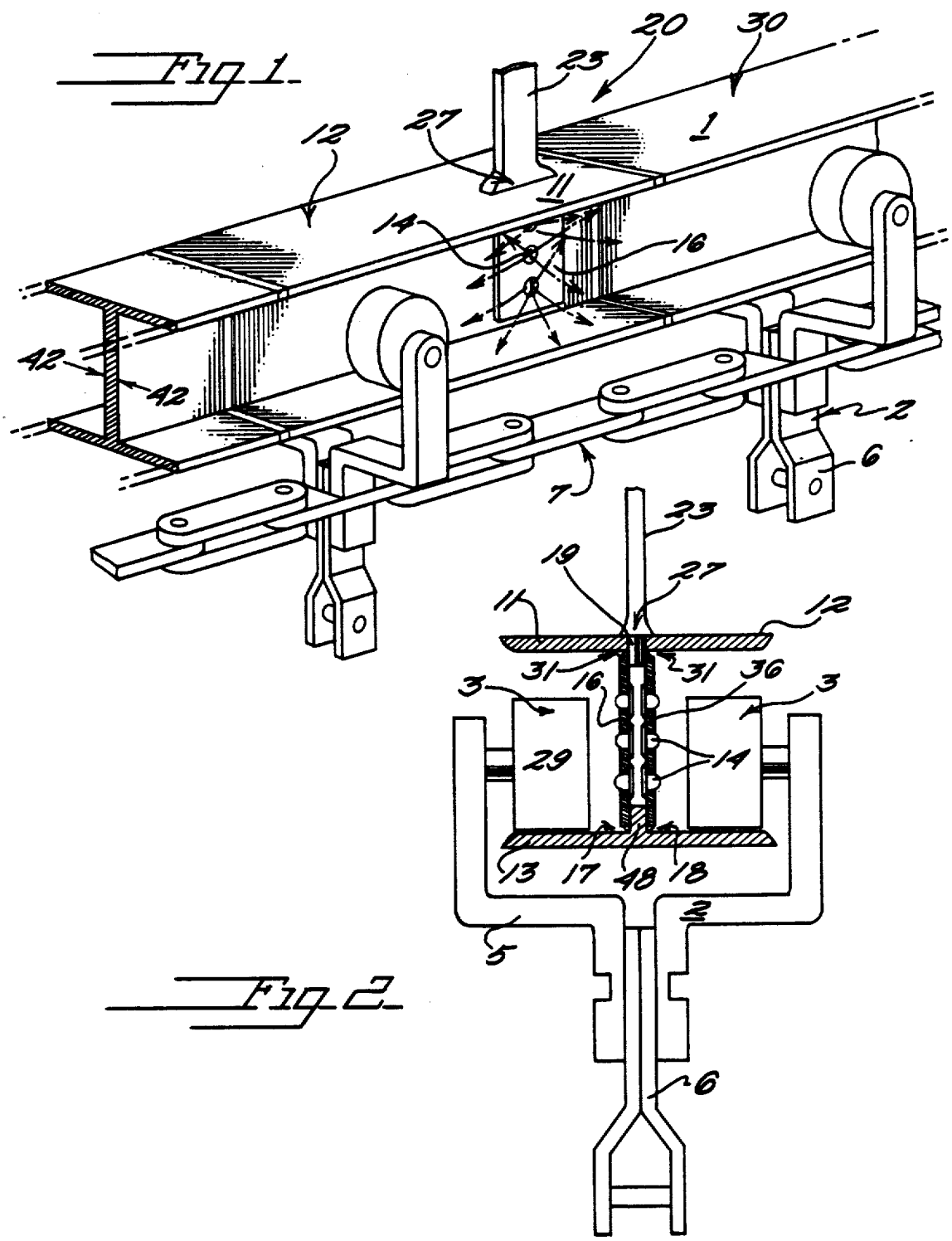

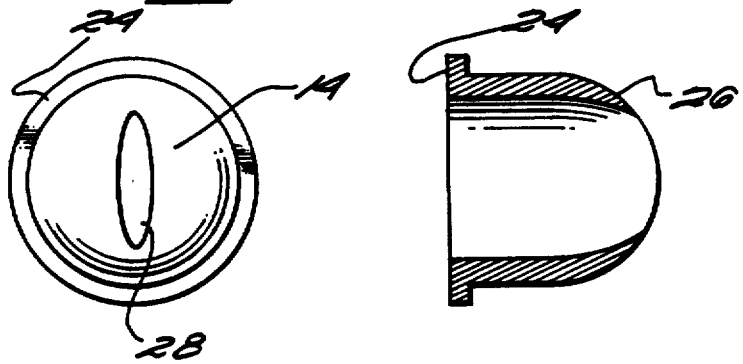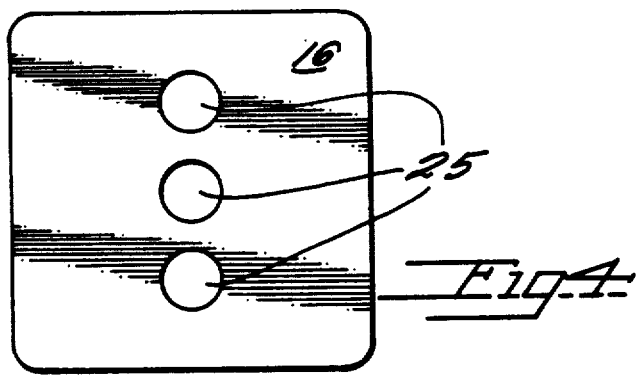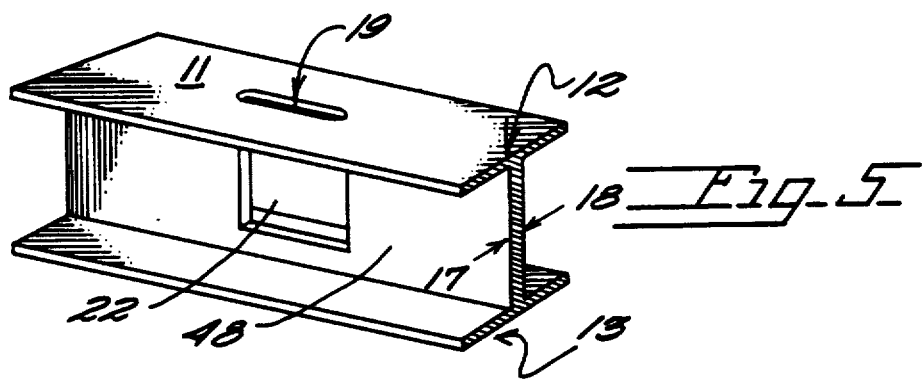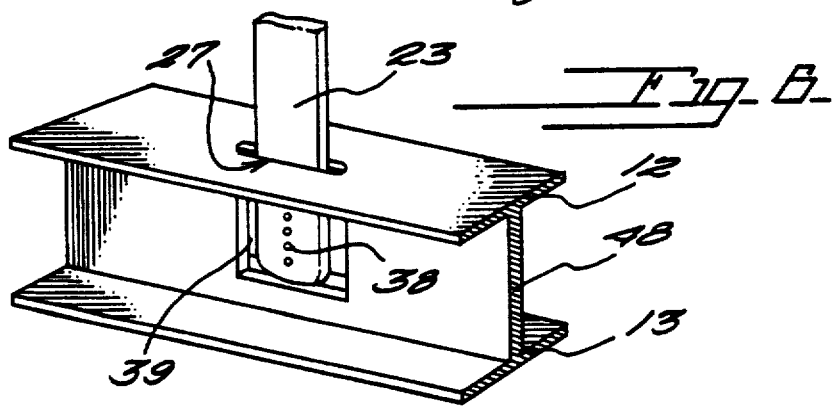

APPARATUS FOR CLEANING OVERHEAD CONVEYOR TROLLEYS

TECHNICAL FIELD

The present invention relates generally to apparatus for cleaning an overhead conveyor system, and more particularly to a cleaning apparatus, that is an integral component of the unit conveyor, that meticulously and continuously cleans the trolleys of the conveyor without disruption of the normal operation of the conveyor.

BACKGROUND OF THE INVENTION

Overhead conveyor systems are widely used in manufacturing and material handling operations; and are particularly ubiquitous in the animal butchering industries, such as processing plants for poultry and other fowl. The conveyors are used to move the carcasses through the plant in assembly-line like fashion. The conveyor system typically includes an elevated suspended guide rail, which is a beam having an I, H, T or channel iron shape, and a series of interconnected wheeled trolley elements which hang from the rail and are coupled to each other through a flexible chain like linkage. In the I beam rail configuration, which is the most popular, the trolleys have a pair of bearing wheels which ride on the upper surface of the lower flange of the I beam. The wheels extend from a yoke frame that girdles beneath and is centered on the web of the I beam. The wheels are spaced from each other by a width that is just slightly greater than the thickness of the web of the I beam, such that one wheel cannot slip off the lower flange, as the opposed wheel will encounter the web of the I beam. The chain like linkage is propelled, usually by a powered sprocket, and this in turn moves the trolleys along the guide rail.

In poultry processing plants the conveyor system is used to carry the bird to and from the numerous work stations as the bird is incrementally processed into a food product. Because the conveyed material is a food product, an essential performance criteria is that the conveyor is kept clean of oil, dirt and other types of grime and contamination. Throughout the processing steps, which include killing, scalding, depluming, cropping the head and feet, and evisceration, there are a lot of small bits of flesh, oil, bone, et cetera generated, and so, the carcass, which is suspended from a shackle attached to the yoke frame of the trolley, becomes littered with this debris. To correct this the bird is rinsed over and over to remove remnants of the the last work station and insure cleanliness. One of the sources of contamination can also be the overhead conveyor itself, because it, and in particular the trolleys are exposed to many of the processing operations, and so the conveyor is cleaned during the cleanup shift. A problem with cleaning the conveyor only on the cleanup shift is that the level of contamination tends to increase from this source as the production shift lengthens; and so in-line continuous cleaning would be preferable.

Bowman'4,678,075 discloses an overhead conveyor cleaning device for cleaning conveyors used in electrostatic painting operations that employees an assemblage of brushes that scrap the trolley and chain-like linkage as they proceed past the device, therein enabling continuous operation of the conveyor. In butchering operations, and particularly in poultry processing, copious quantities of water are needed to achieve the required level of cleanliness, and brushes in and of themselves would be inadequate to the task. Also, because water is used in processing the bird, debris, and especially remnants, are deposited and impacted in the smallest seams and orifices of the overhead conveyor.

An interior side of a trolley wheel adjacent to the web of the guide rail is one of the more particularly difficult parts of the conveyor system to clean, and can be a major source of contamination. The contamination problem is further aggravated because of the accompanying mechanical action of the wheel which serves to distribute the contamination throughout the entire length of the conveyor system, and to speed up the breakdown of remnants by the abrasive action of a wheel riding along.the guide rail. Water sprays emanating from sources designed to clean the carcass are not very effective because the body of the trolley wheel is interposed between the interior side of the trolley wheel and the directed spray of water. The upper flange of the guide rail shrouds the interior side of a trolley wheel from an overhead washing stream of water.

The present invention is an apparatus that cleans the trolley wheels, and in particular the interior sides of the trolley wheels, to a degree and in a manner that is suitable to standards established and enforced by the United States Department of Agriculture.

SUMMARY OF THE INVENTION

- In accordance with the present invention, a cleaning apparatus for use with an overhead conveyor system is disclosed which has been particularly configured for application in poultry processing plants which utilize overhead conveyors to transport the bird to and from the numerous processing work stations. The present invention is designed to meet existing Department of Agriculture guidelines for "Accepted Equipment For Meat and Poultry Plants", to be compatible and retrofittable to existing overhead conveyors, to be relatively easily maintained, and to be reliable, giving long hours of continuous service.

Generally, the present invention is a sectional length of I beam shaped girder containing a series of spray nozzles flush mounted into both sides of the vertical structural component of the girder (where the vertical structural component of the girder corresponds to the web of the guide rail), and from which series of nozzles there emanates a pressurized fluid which cleans the trolley wheels as they roll along the girder past the nozzles. When installing, the cleaning apparatus is substituted integrally for a comparable sectional length of conveyor guide rail, such that the cleaning apparatus is in-line and coextensive with the suspended conveyor guide rail system. The trolleys track onto and off of the cleaning apparatus just as if it were the original guide rail. The girder is machined such that it has a network of fluid communicating channels that enable the pressurized fluid to pass downward, from the upper horizontal structural component of the girder (where the upper horizontal structural component corresponds to the upper flange of an I beam), through the center of the vertical structural component of the girder and exits the vertical structural component, laterally, on both sides through nozzles. The nozzles direct the spray of the pressurized fluid generally toward the trolley wheels, and especially toward the interior sides of the trolley wheels. The pressurized fluid, where the fluid is generally either water or air, emanates from the nozzles with sufficient pressure as to have substantial scrubbing and cleansing action when impacting the wheels of the trolley. The nozzles, which are very nearly flush with the exterior lateral surfaces of the vertical structural component, are located at a height comparable to the trolley wheels, however, the nozzles do not restrict the forward motion of the trolleys. The pressurized fluid is directed at close range, and as such is very effective at dislodging remnants, dirt and other types of debris lodged on the trolley wheels.

It is preferable to locate the cleaning apparatus at a position in the conveyor system, where the trolley is nominally not carrying a bird, because runoff wash fluid drains down the yoke frame and onto the shackle. An alternate choice of operation to use the cleaning apparatus only on the clean up shift; permitting that the production shift is not long enough to create any contamination problems.

The network of fluid communicating channels, which consist of a main channel and at least one distribution channel, are supplied by the plant utility system with sufficient pressurized fluid to insure that pressures in excess of 100 psi are maintained, and water pressures in excess of 600 psi are preferred. The network of fluid communicating channels are generally designed to be of sufficient size and form, within the constraints of the size and shape of the girder, as to minimize pressure drop over the network.

The cleansing ability of the pressurized fluid, when it is water, can be enhanced by using hot water, by adding surface active agents and oxidizing chemicals, and by increasing the spray velocity using water supplied from a high pressure washer.

The cleaning apparatus can have several sets of networks of fluid communicating channels and nozzles located in a series of cleaning stations. For instance, a three work station cleaning apparatus could have hot water, to which has been admixed a wetting agent, emanating from the nozzles in the first station, cool rinse water emanating from the nozzles in the second station, and dry clean pressurized air emanating from the nozzles in the third station.

The present invention may also have a sensor to detect the presence of and position of a trolley, which in turn, upon such detection, controls a valve that throttles the flow through the network of fluid communicating channels.

The cleaning apparatus is constructed from materials that do not rapidly wear out or corrode in the presence of water. Stainless steel has been found to be an excellent construction material.

BRIEF DESCRIPTION OF THE DRAWINGS

FIG. 1 is a perspective view of an overhead conveyor system having an I beam guide rail provided with a cleaning apparatus embodying the principles of the present invention.

FIG. 2 is a vertical sectional view of the cleaning apparatus 20 taken along the plane indicated by sectional line 2—2 of FIG. 1.

FIG. 3 is a perspective view of a nozzle as seen from the side and from the front.

FIG. 4 is a perspective view of a plate which houses the nozzles and is used in the fabrication of the fluid distribution channels.

FIG. 5 is a perspective view of the girder in the process of being fabricated into the cleaning apparatus shown in FIG. 1, prior to the fitting of the plates housing the nozzles, which shows the fluid distribution channels.

FIG. 6 is a perspective view of an alternative embodiment of the present invention, where the alternative embodiment is particularly distinctive in its ease of fabrication.

DETAILED DESCRIPTION

An embodiment of the cleaning apparatus, generally referred to as 20, is shown in FIG. 1 in relationship to the guide rail 1 of the overhead conveyor 30. The guide rail 1 is a suspended I beam having an upper flange 9, a lower flange 10, and a web 8. The guide rail 1 has a height of 3 inches and a width of 2.25 inches. The web is 3/16 inches thick. The overhead conveyor 30 has multiple trolleys 2, which are linked in serial fashion to each other via a chain 7. Each trolley 2 is fitted with a pair of wheels 3 which extend from a yoke 5 that girdles beneath the guide rail 1. Each trolley 2 conveys one carcass which is hung from the yoke 5 on a shackle that is attached to the yoke 5 by the hanger 6. The wheels 3 are spaced so that they are separated by a gap that is only slightly wider than the thickness of the web 8 of the guide rail 1, with the gap ranging from $\frac{1}{4}$ to $\frac{3}{8}$ inches, depending on the manufacturer of the trolley. With a web thickness of 3/16 inches, the interior side of each wheel 4 would, on average, clear the lateral face 42 of the web by 5/32 to 9/32 inches. The narrow spacing of the wheels assures that the trolleys will closely track the guide rail, but makes cleaning the wheels difficult. The cleaning apparatus 20 is in part comprised of a girder 11 having the same overall width, height and thickness dimensions as the guide rail 1, where the girder 11 is spliced in-line such that it is coextensive with the guide rail 1. The grider 11, like the guide rail 1 is an I beam, and has an upper horizontal structural component 12 that corresponds to the upper flange 9, a lower horizontal structural component 13 that corresponds to the lower flange 10, and a vertical structural component 48 that corresponds to the web 8 of the guide rail 1. In the present embodiment, the right and left lateral faces, 17 and 18, of the vertical structural component 48 have, respectively, a right and left rectangular plate, 16 and 36, which are surface welded to the corresponding face 16 to 17 and 36 to 18. A rectangular section of the vertical structural component 48, sandwiched between the two rectangular plates, 16 and 36, has been cut out, such that the welded plates form a hollow, water tight cavity 22 in the girder 11, where the cavity 22 serves as a pressurized fluid distribution channel 21. As shown in FIG. 1, in each plate there are three nozzles 14, where the nozzles 14 are aligned vertically over the distribution channel 21 and are mounted such that they are nearly flush with the surface of the plate. Each nozzle 14 directs a spray of water 45, where the water is pressurized to 800 psi and heated to 140° F., laterally in a spatial pattern such that the water will impact a designated area of a passing trolley wheel 3. The distribution channel 21 is supplied by the main channel 19 which is an oblong semicircular channel, (approximately 3/16×1.5 inches), that feeds from the upper horizontal structural component 12 down through the vertical structural component 48 to the distribution channel 21. The main channel 19 is supplied high pressure heated water from a $\frac{3}{8}$ inch I D pipe 23 having an attenuated flattened end that is welded to the oblong semicircular entrance 27 of the main channel 19 located on the top of the upper horizontal structural component 12 of the girder 11.

FIG. 2 is a vertical sectional view of the cleaning apparatus 20 taken along the plane indicated by sectional line 2—2 of FIG. 1. FIG. 2 further illustrates the nozzles, plates and channels of the present embodiment. Nozzle 14, shown separately in FIG. 3, has a spout 26 which projects through hole 25 in plate 16, and a circular shank 24 that is a mounting flange, where the nozzle is welded along the shank 24 to the inside wall of plate 16 such that the nozzle's slit orifice 28 has a vertical orientation. The nozzle weld line 29 is continuous and water tight, capable of withstanding internal pressures in excess of 800 psi. The right plate 16, shown separately in FIG. 4, is ⅛ inch thick and is rectangular in shape, having a height of 2 inches and a width of 1.75 inches. There are three vertically aligned holes 25, having a ⅜ inch diameter, cut in the plate 16. The left plate 36 is the mirror image of the right plate 16. In fabricating the distribution channel 21 of the cleaning apparatus 20, a rectangular blank having dimensions of 1.75 inches height and 1.5 inches width is cut out of the vertical structural component 48 of the girder 11. FIG. 5 shows the girder 11 in the process of being modified to house the nozzles 14. The rectangular blank, which is ultimately going to form the distribution channel 21, has been cut out of the girder; and the oblong semicircular main channel 19 has been drilled out. The right and left plates, 16 and 36, with nozzles 14, are then positioned over the resulting rectangular cavity 22 and surface welded to a lateral face 17 and 18 of the vertical structural component 48. The plate weld line 31 is continuous and water tight, capable of withstanding internal pressures forming in the cavity 22 in excess of 800 psi. The overall thickness of the two plates 16 and 36 and the sandwiched vertical structural component 48 is approximately 5/16 inches, which is sufficiently narrow as to not impede the wheels 3 of a passing trolley 2. The main channel 19 supplies high pressure water to the distribution channel 21 which feeds the six nozzles 14, which emit a directed spray of water 45. The flow rate of water is approximately five gallons per minute.

FIG. 6 depicts an alternative embodiment of the present invention, that is particularly easy to fabricate. In this embodiment the flattened pipe 23, itself, has been modified to replace the main channel 19 and the distribution channel 21, and the nozzles 14 have been replaced with drilled multiple holes 38. In the illustrated embodiment a one inch diameter pipe is flattened to 3/16 inches. The pipe wall thickness is about ⅛ inch yielding a total thickness of 7/16 inches. On each flattened side of pipe there are five small holes 38. The flattened end of the pipe is plugged and welded water tight. An oblong semicircular hole 27 large enough to accommodate the flattened pipe 23 is cut in the upper horizontal structural component 12 of the girder 11. A 2.5 inch×2.5 inch open section 39 of vertical structural component 48 is cut into the girder 11. The flattened pipe 23 is positioned and welded to the topside of the upper horizontal structural component 12.

I claim:

1. An apparatus for cleaning a trolley wheel of a trolley of an overhead conveyor system, wherein said apparatus effects cleaning without disruption of the operation of the overhead conveyor system in an essentially continuous manner, wherein said apparatus effects cleaning to a level of sufficiency, thoroughness and safety as to be utilizable in animal butchering operations, and wherein said apparatus effects cleaning with minimal requirements for in service maintenance, said apparatus comprising:

an I beam shaped girder consisting of a vertical structural component, an upper horizontal structural component and a lower horizontal structural component, wherein the girder has overall vertical and horizontal proportions comparable in size and form to the guide rail and when adopted to the overhead conveyor tracks coextensive with the guide rail, wherein the girder has a nozzle mounted essentially in a plane defined by a lateral face of the vertical structural component between the upper horizontal structural component and the lower horizontal structural component such that a pressurized fluid emanating from the nozzle sprays through a spatial region that will impact an area on a trolley wheel passing by the nozzle; wherein the girder has a network of fluid communicating channels, which are within the structural components of the girder, where said network of fluid communicating channels supplies a pressurized fluid to the nozzle, where the network generally consists of a main channel originating on the topside of the upper horizontal structural component and passes downward through the vertical structural component into a cavity where a lateral wall of the cavity is essentially in the plane defined by the lateral face of the vertical structural component between the upper horizontal structural component and the lower horizontal structural component, wherein said cavity forms the distribution channel which supplies the nozzle, where the fluid communicating channels are supplied externally with a fluid which has been pressurized to a level such that, upon impacting the trolley wheel, the fluid has excellent cleaning properties.

2. The cleaning apparatus as claimed in claim 1 wherein said cavity is formed by sandwiching the vertical structural component, where the component has a rectangular hole cut therein, between a rectangular plate on one lateral face of the vertical structural component and an opposing rectangular plate on the other lateral face of the vertical structural component, such that the plates overlap and cap the rectangular hole; wherein said cavity is sealed by welding a perimeter of each of the opposing plate to its respective lateral face, therein forming a water tight pressurizable cavity which serves as a distribution channel for the fluid.

3. The cleaning apparatus as claimed in claim 2 wherein the plate contains a nozzle mounting hole in which is fitted a nozzle having a flanged shank and a spout, wherein said spout projects from the cavity through the nozzle mounting hole, and the nozzle is fitted and sealed by welding a perimeter of the flanged shank to the plate.

4. The cleaning apparatus as claimed in claim 1 wherein the main channel consists of an oblong semicircular orifice, having a width that is comparable to the thickness of the vertical structural component, where the main channel originates topside on the upper horizontal structural component of the girder and passes downward emptying into the distribution channel cavity, wherein said main channel is fed fluid from a pipe having an attenuated flattened stem that is welded to the oblong semicircular orifice.

5. The cleaning apparatus as claimed in claim 1 wherein the preferred pressurized fluid is water, which preferably is pressurized to 600 psi or higher.

6. The cleaning apparatus as claimed in claim 5 wherein the water is heated to 140° F.

7. The cleaning apparatus as claimed in claim 1 wherein the girder is fitted with six nozzles, one set of three on each side in an opposing configuration, where each set of three is aligned vertically and mounted essentially in a plane defined by the lateral face of the vertical structural component between the upper horizontal structural component and the lower horizontal structural component such that the pressurized fluid emanating from the individual nozzles sprays through a spatial region that will impact an area on a trolley wheel passing by the nozzle, and the set of three will spray through an overlapping spatial region that will impact a larger area on the trolley wheel; and the two sets of three, taken together, will simultaneously clean both trolley wheels on a trolley having paired wheels.

8. The cleaning apparatus as claimed in claim 6 wherein the water is pumped through the cleaning apparatus at a flow rate of at least five gallons per minute.

9. An apparatus for cleaning a trolley wheel of a trolley of an overhead conveyor system, wherein said apparatus effects cleaning without disruption of the operation of the overhead conveyor system in an essentially continuous manner, wherein said apparatus effects cleaning to a level of sufficiency, thoroughness and safety as to be utilizable in animal butchering operations, and wherein said apparatus effects cleaning with minimal requirements for in service maintenance, said apparatus comprising:

an I beam shaped girder consisting of a vertical structural component, an upper horizontal structural component and a lower horizontal structural component, wherein the girder has overall vertical and horizontal proportions comparable in size and form to the guide rail and when adopted to the overhead conveyor tracks coextensive with the guide rail, wherein the girder has an open section, where a portion of the vertical structural component is cut out, and a flattened pipe that projects downward through an oblong semicircular orifice cut in the upper horizontal structural component into the open section, wherein said flattened pipe has a short diameter that is comparable in thickness to the vertical structural component, wherein said flattened pipe has multiple small holes located in the open section of the girder, which act as nozzles, positioned essentially in a plane defined by the lateral face of the vertical structural component between the upper horizontal structural component and the lower horizontal structural component such that a pressurized fluid emanating from the multiple small holes sprays through a spatial region that will impact an area on a trolley wheel passing by, wherein said flattened pipe has an end which is plugged and welded water tight and said flattened pipe is securely fastened to the girder via the upper horizontal structural component; where the flattened pipe is supplied externally with a fluid which has been pressurized to a level such that, upon impacting the trolley wheel, the fluid has excellent cleaning properties.

10. The cleaning apparatus as claimed in claim 9 wherein the preferred pressurized fluid is water, which preferably is pressurized to 600 psi or higher.

11. The cleaning apparatus as claimed in claim 10 wherein the water is heated to 140° F.

12. The cleaning apparatus as claimed in claim 11 wherein the water is pumped through the cleaning apparatus at a flow rate of at least five gallons per minute.

* * * * *